(12) United States Patent
Seto

(10) Patent No.: US 11,991,329 B2
(45) Date of Patent: May 21, 2024

(54) IMAGE READING APPARATUS THAT SWITCHES READING MODE DEPENDING ON WHETHER DOCUMENT MAY BE DISCHARGED TO DISCHARGE TRAY, AND IMAGE FORMING APPARATUS

(71) Applicant: KYOCERA Document Solutions Inc., Osaka (JP)

(72) Inventor: Akifumi Seto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/208,779

(22) Filed: Jun. 12, 2023

(65) Prior Publication Data

US 2023/0412747 A1 Dec. 21, 2023

(30) Foreign Application Priority Data

Jun. 21, 2022 (JP) .................................. 2022-099856

(51) Int. Cl.
*H04N 1/04* (2006.01)
*B65H 29/60* (2006.01)
*B65H 43/06* (2006.01)
*H04N 1/00* (2006.01)

(52) U.S. Cl.
CPC ......... *H04N 1/00822* (2013.01); *B65H 29/60* (2013.01); *B65H 43/06* (2013.01); *H04N 1/00612* (2013.01); *H04N 1/00615* (2013.01); *H04N 1/00633* (2013.01);
(Continued)

(58) Field of Classification Search
None
See application file for complete search history.

(56) References Cited

U.S. PATENT DOCUMENTS

| 2010/0158592 A1* | 6/2010 | Odagiri | H04N 1/32133 399/365 |
| 2011/0069359 A1* | 3/2011 | Tojo | H04N 1/00572 358/498 |
| 2021/0099593 A1* | 4/2021 | Nakagawa | B65H 29/60 |

(Continued)

FOREIGN PATENT DOCUMENTS

| JP | H10171180 A | 6/1998 |
| JP | 2021109713 A | 8/2021 |
| JP | 2021193049 A | 12/2021 |

*Primary Examiner* — Dung D Tran
(74) *Attorney, Agent, or Firm* — IP Business Solutions, LLC

(57) ABSTRACT

An image reading apparatus includes a common transport route, a first and a second transport route, a first and a second image sensor, a first and a second discharge tray, and a controller. The controller executes a first reading mode including guiding the document from the common transport route to the first transport route, reading the image on the first face of the document with the first image sensor, and discharging the document to the first discharge tray, or a second reading mode including reading the image on the second face of the document with the second image sensor, guiding the document from the common transport route to the second transport route, and discharging the document to the second discharge tray, inhibits the first reading mode, upon deciding that the first discharge tray is full, and inhibits the second reading mode, upon deciding that the second discharge tray is full.

4 Claims, 11 Drawing Sheets

(52) U.S. Cl.
CPC ....... *H04N 1/0464* (2013.01); *B65H 2513/42* (2013.01); *B65H 2801/06* (2013.01)

(56) References Cited

U.S. PATENT DOCUMENTS

| | | | |
|---|---|---|---|
| 2021/0101769 A1* | 4/2021 | Kawasaki | B65H 31/24 |
| 2022/0303397 A1* | 9/2022 | Hayashi | H04N 1/00795 |
| 2022/0303414 A1* | 9/2022 | Yasui | H04N 1/00612 |
| 2023/0283728 A1* | 9/2023 | Kimura | H04N 1/00824 |
| | | | 358/1.15 |

* cited by examiner

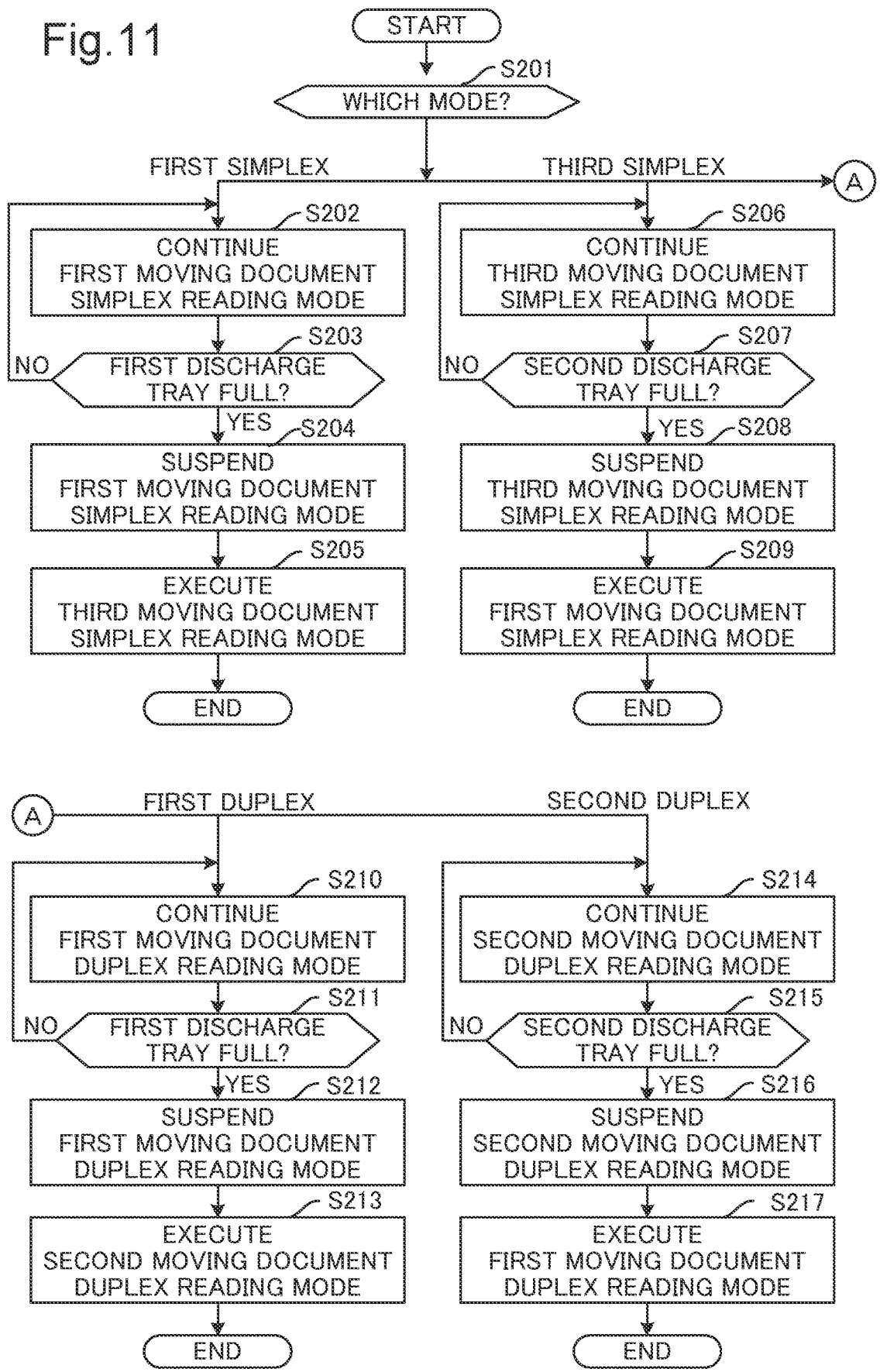

IMAGE READING APPARATUS THAT SWITCHES READING MODE DEPENDING ON WHETHER DOCUMENT MAY BE DISCHARGED TO DISCHARGE TRAY, AND IMAGE FORMING APPARATUS

INCORPORATION BY REFERENCE

This application claims priority to Japanese Patent Application No. 2022-099856 filed on Jun. 21, 2022, the entire contents of which are incorporated by reference herein.

BACKGROUND

The present disclosure relates to an image reading apparatus that reads an image of a document while transporting the document through one of a plurality of transport routes, and an image forming apparatus incorporated with such image reading apparatus. In particular, the disclosure relates to a technique to efficiently read the image of the document.

The image reading apparatus is configured to draw out a document from a document tray and transport the same through one of the plurality of transport routes, read the image on the front face of the document being transported through the one transport route, read the image on the back face of the document being transported through another transport route, and discharge the document from either transport route to the corresponding discharge tray.

In addition, an automatic document feeder is known that includes a sensor for detecting whether a document is present on the discharge tray. Such automatic document feeder draws out the document from the document tray, and reads the image of the document. The automatic document feeder counts the number of documents discharged to the discharge tray, each time the document is displayed thereto, and suspends drawing out the document and reading the same, when the counted number of documents reaches an upper-limit number of documents. When the documents on the discharge tray are removed, and the sensor detects that no document is on the discharge tray, the automatic document feeder resumes drawing out the document from the document tray.

SUMMARY

The disclosure proposes further improvement of the foregoing techniques.

In an aspect, the disclosure provides an image reading apparatus including a document tray, a common transport route, a first transport route and a second transport route, a switching device, a document transport device, a first image sensor, a second image sensor, a first discharge tray, a second discharge tray, and a controller. The first transport route and the second transport route are branched from the common transport route. The switching device is provided at a branch point between the first transport route and the second transport route, and guides the document from the common transport route, to one of the first transport route and the second transport route. The document transport device draws out the document placed on the document tray therefrom, transports the document through the common transport route, and delivers the document transported from the common transport route, to one of the first transport route and the second transport route, via the switching device. The first image sensor reads an image on a first face of the document being transported through the first transport route. The second image sensor reads an image on a second face of the document being transported through the common transport route. The first discharge tray receives the document delivered from the first transport route. The second discharge tray receives the document delivered from the second transport route. The controller includes a processor, and executes, when the processor executes a control program, one of a first simplex reading mode including causing the switching device to guide the document from the common transport route to the first transport route, causing the first image sensor to read the image on the first face of the document, and discharging the document to the first discharge tray, and a second simplex reading mode including causing the second image sensor to read the image on the second face of the document, causing the switching device to guide the document from the common transport route to the second transport route, and discharging the document to the second discharge tray, decides whether the document may be discharged to the first discharge tray, and whether the document may be discharged to the second discharge tray, inhibits the first simplex reading mode, upon deciding that the document should not be discharged to the first discharge tray, and inhibits the second simplex reading mode, upon deciding that the document should not be discharged to the second discharge tray.

In another aspect, the disclosure provides an image reading apparatus including a document tray, a common transport route, a first transport route and a second transport route, a switching device, a document transport device, a first image sensor, a third image sensor, a first discharge tray, a second discharge tray, and a controller. The first transport route and the second transport route are branched from the common transport route. The switching device is provided at a branch point between the first transport route and the second transport route, and guides the document from the common transport route, to one of the first transport route and the second transport route. The document transport device draws out the document placed on the document tray therefrom, transports the document through the common transport route, and delivers the document transported from the common transport route, to one of the first transport route and the second transport route, via the switching device. The first image sensor reads an image on a first face of the document being transported through the first transport route. The third image sensor reads an image on the first face of the document being transported through the second transport route. The first discharge tray receives the document delivered from the first transport route. The second discharge tray receives the document delivered from the second transport route. The controller includes a processor, and executes, when the processor executes a control program, one of a first simplex reading mode including causing the switching device to guide the document from the common transport route to the first transport route, causing the first image sensor to read the image on the first face of the document, and discharging the document to the first discharge tray, and a third simplex reading mode including causing the switching device to guide the document from the common transport route to the second transport route, causing the third image sensor to read the image on the first face of the document, and discharging the document to the second discharge tray, decides whether the document may be discharged to the first discharge tray, and whether the document may be discharged to the second discharge tray, inhibits the first simplex reading mode and executes the third simplex reading mode, upon deciding, during execution of the first simplex reading mode, that the document should not be discharged to the first discharge tray, and inhibits the third simplex reading mode and executes the first simplex reading mode, upon deciding, during execution of the third simplex reading mode, that the document should not be discharged to the second discharge tray.

In still another aspect, the disclosure provides an image forming apparatus including the foregoing image reading apparatus, and an image forming device that forms the image of the document read by the image reading apparatus, on a recording sheet.

BRIEF DESCRIPTION OF THE DRAWINGS

FIG. 11 is a flowchart showing a control process of a discharge destination switching operation, according to the second embodiment.

DETAILED DESCRIPTION

Hereafter, some embodiments of the disclosure will be described, with reference to the drawings.

First Embodiment

Figure 1:
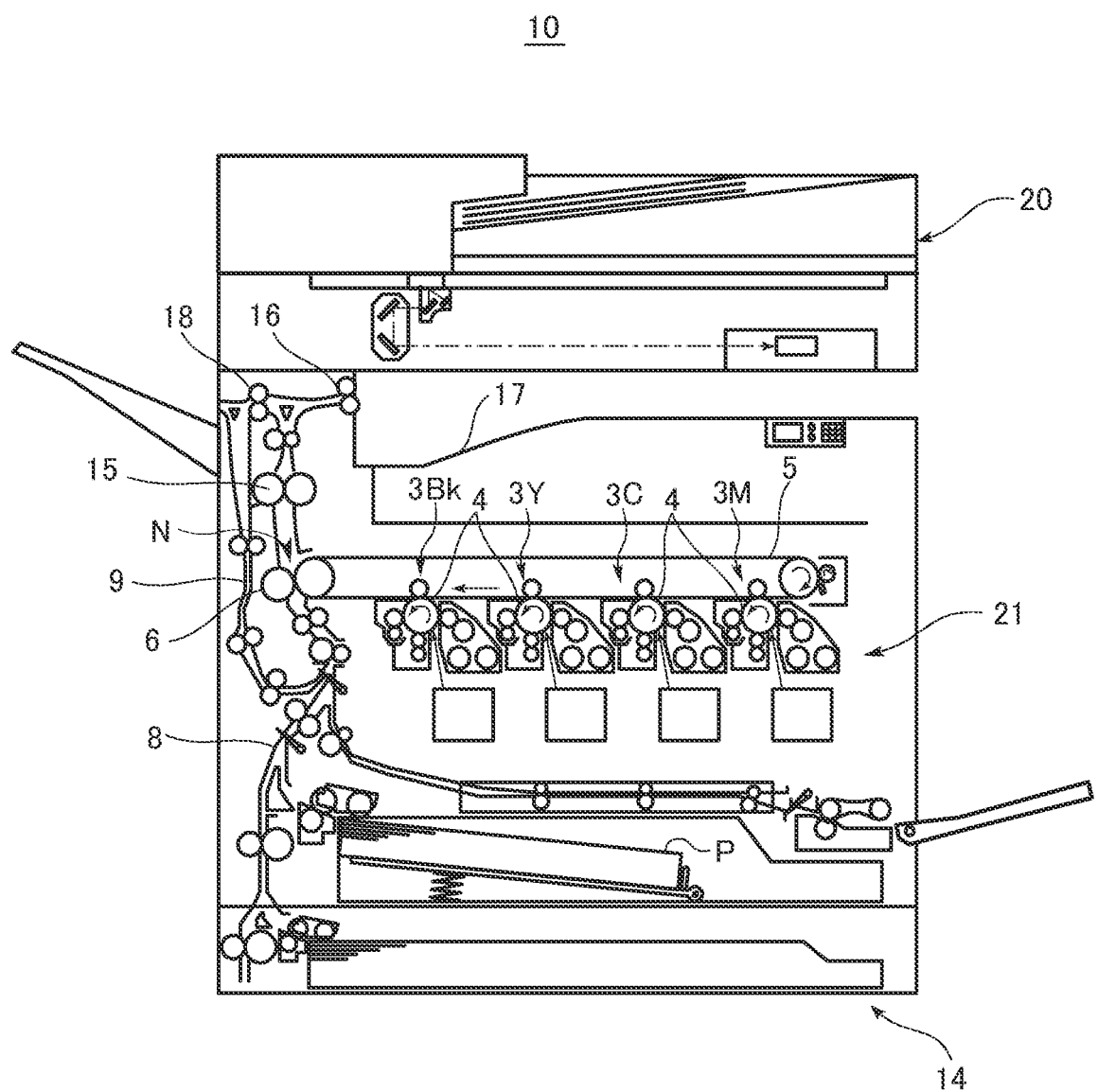
FIG. 1 is a cross-sectional view showing an image forming apparatus.

FIG. 1 is a cross-sectional view showing an image forming apparatus 10, incorporated with an image reading apparatus 20 according to a first embodiment of the disclosure. As shown in FIG. 1, the image forming apparatus 10 includes the image reading apparatus 20 and an image forming device 21.

The image reading apparatus 20 includes an image sensor (CCD sensor or contact image sensor) that optically reads an image of a document. The image reading apparatus 20 converts an analog output from the image sensor into a digital signal, and generates image data representing the image of the document.

The image forming device 21 serves to print the image represented by the image data, on a recording sheet. The image forming device 21 includes an image forming unit 3M for magenta, an image forming unit 3C for cyan, an image forming unit 3Y for yellow, and an image forming unit 3Bk for black. In each of the image forming units 3M, 3C, 3Y, and 3Bk, the surface of a photoconductor drum 4 is uniformly charged and exposed, to thereby form an electrostatic latent image on the surface of the photoconductor drum 4, and then the electrostatic latent image on the surface of the photoconductor drum 4 is developed into a toner image, which is transferred to an intermediate transfer belt 5. As result, a colored toner image is formed on the intermediate transfer belt 5. The colored toner image is transferred, as secondary transfer, to the recording sheet P transported from a sheet feeding device 14 along a first transport route 8, at a nip region N between the intermediate transfer belt 5 and a secondary transfer roller 6.

A fixing device 15 heats and presses the recording sheet P, to fix the toner image onto the recording sheet P, by thermal compression. A delivery roller 16 delivers the recording sheet P to an output tray 17.

When the image of the document is to be also printed on the back face of the recording sheet P, the image forming apparatus 10 performs switchback transport, including transporting the recording sheet P to the delivery roller 16 communicating with the output tray 17, stopping the delivery roller 16 once, and causing the delivery roller 16 to rotate reversely. The image forming apparatus 10 returns the recording sheet P to the first transport route 8, from a transport roller 18 through a second transport route 9, thereby reversing the front and back faces of the recording sheet P. Then the image forming apparatus 10 causes the image forming device 21 to form an image of the document on the back face of the recording sheet P, and delivers the recording sheet P to the output tray 17, through the delivery roller 16.

Figure 2:
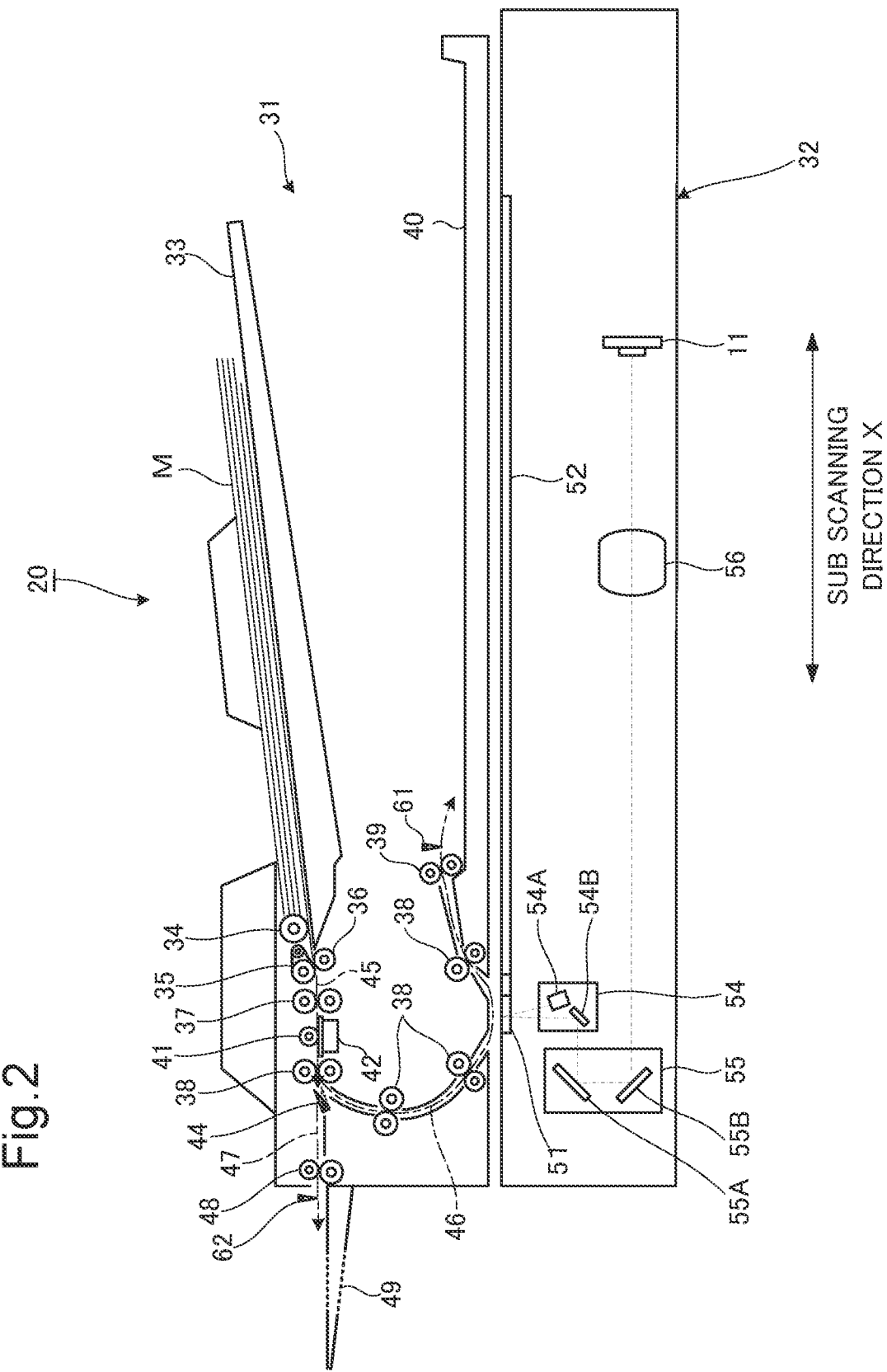
FIG. 2 is a cross-sectional view showing an image reading apparatus according to a first embodiment.
Figure 3:
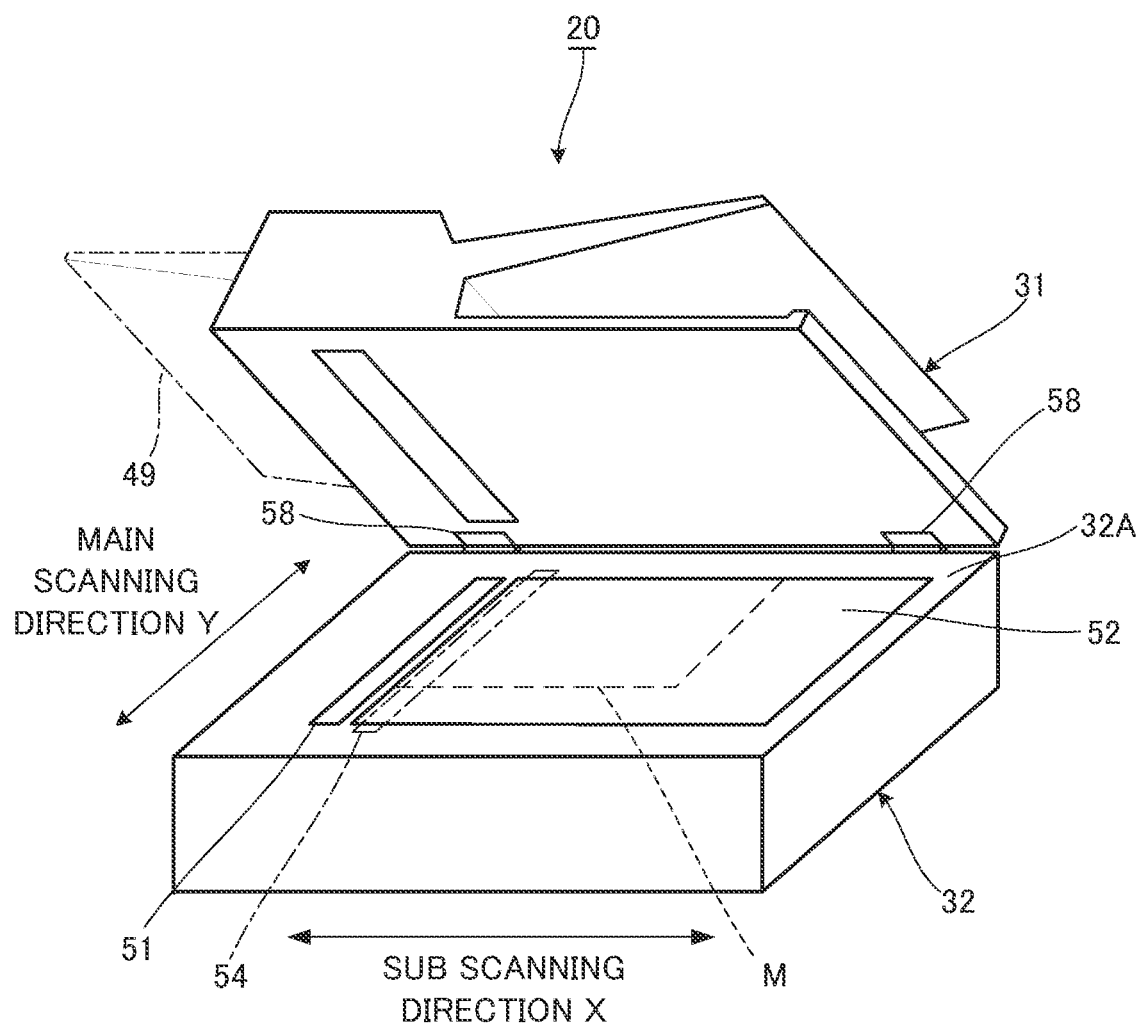
FIG. 3 is a perspective view showing the appearance of the image reading apparatus according to the first embodiment.

Hereunder, the image reading apparatus 20 will be described. FIG. 2 is a cross-sectional view showing the image reading apparatus 20. FIG. 3 is a perspective view showing the appearance of the image reading apparatus 20. FIG. 3 illustrates the state where the document transport device 31 is open.

As shown in FIG. 2 and FIG. 3, the image reading apparatus 20 includes a document transport device 31 and a reading device 32. The document transport device 31 includes a document tray 33, a feeding roller 34, a transport belt 35, a retard roller 36, a resist roller 37, a plurality of transport rollers 38, a first discharge roller 39, a first discharge tray 40, a contact image sensor (CIS) 42, a second discharge roller 48, and a second discharge tray 49.

The contact image sensor 42 corresponds to the second image sensor in the disclosure. Hereinafter, the contact image sensor 42 will be referred to as CIS 42.

In the document transport device 31, when a document M is placed on the document tray 33, the feeding roller 34 draws out the document M from the document tray 33. The document M is delivered to a common transport route 45, through between the transport belt 35 and the retard roller 36. Then the document M is transported, either through a first transport route 46 which is curved, or a second transport route 47 which is linear.

A switching claw 44 (exemplifying the switching device in the disclosure) is provided at the branch point between the first transport route 46 and the second transport route 47. The shaft of the switching claw 44 attached to the left end thereof is made to reciprocatively rotate over a predetermined range, by an actuator. Accordingly, the distal end portion of the switching claw 44 is oriented obliquely upward or in the horizontal direction. When the distal end portion of the switching claw 44 is oriented obliquely upward, the document M is guided to the first transport route 46, from the common transport route 45. When the distal end portion of the switching claw 44 is oriented in the horizonal direction, the document M is guided to the second transport route 47, from the common transport route 45.

Through the common transport route 45, the document M is transported from the resist roller 37, through between the first CIS 42 and a shading roller 41, and reaches the switching claw 44. The CIS 42 reads the image on the downwardly oriented face of the document M passing through between the CIS 42 and a shading roller 41.

Through the first transport route 46, the document M is guided downward by the switching claw 44, and transported to a first platen glass 51. The document M passes over the first platen glass 51, and is discharged to the first discharge tray 40, by the first discharge roller 39.

Through the second transport route 47, the document M is guided in the horizontal direction by the switching claw 44, and discharged to the second discharge tray 49, by the second discharge roller 48.

A first full-load detector 61 is provided on the first discharge tray 40. The first full-load detector 61 detects that the first discharge tray 40 has become filled up with a plurality of documents M. A second full-load detector 62 is provided on the second discharge tray 49. The second full-load detector 62 detects that the second discharge tray 49 has become filled up with a plurality of documents M.

The first full-load detector 61 is, for example, pivotably supported on an upper side of the discharge port of the first transport route 46, through which the document M is discharged. The first full-load detector 61 includes a pivotal element to be lifted up by the documents M discharged to and stacked on the first discharge tray 40, and a sensor that detects a predetermined pivotal position that the pivotal element assumes, when the height of the stacked documents M reaches a predetermined threshold. When the sensor detects the predetermined pivotal position, the first discharge tray 40 can be considered as being filled up. The second full-load detector 62 is, for example, pivotably supported on an upper side of the discharge port of the second transport route 47, through which the document M is discharged. The second full-load detector 62 includes a pivotal element to be lifted up by the documents M discharged to and stacked on the second discharge tray 49, and a sensor that detects a predetermined pivotal position that the pivotal element assumes, when the height of the stacked documents M reaches a predetermined threshold. When the sensor detects the predetermined pivotal position, the second discharge tray 49 can be considered as being filled up (see Japanese Unexamined Patent Application Publication No. 2021-193049, and Japanese Unexamined Patent Application Publication No. 2021-109713).

The reading device 32 includes the first platen glass 51, a second platen glass 52, a carriage 54, an optical unit 55, a condenser lens 56, and a CCD sensor 11. The CCD sensor 11 corresponds to the first image sensor in the disclosure.

In the reading device 32, the carriage 54 includes a light source 54A that emits light to the document, and a mirror 54B that reflects the light reflected by the document M. The optical unit 55 includes a mirror 55A and a mirror 55B. The mirror 55A reflects the light reflected by the mirror 54B of the carriage 54, generally vertically downward. The mirror 55B reflects the light reflected by the mirror 55A generally horizontally, thus guiding the light to the CCD sensor 11 through the condenser lens 56.

The carriage 54 and the optical unit 55 are configured to reciprocate, along a rail, in a sub scanning direction X orthogonal to a main scanning direction Y. The carriage 54 and the optical unit 55 are driven by a known drive mechanism based on a stepping motor, so as to move in the sub scanning direction X, maintaining a predetermined speed relation.

Two hinges 58 are provided with a spacing between each other, along one end portion of the top face 32A of the reading device 32. These hinges 58 serve to openably support the document transport device 31. Such a configuration enables a user to open or close the document transport device 31.

The image reading apparatus 20 is configured to execute, under the control of a controller 29 (see FIG. 6), four reading modes for reading the image of the document M, namely a fixed document reading mode, a first moving document simplex reading mode, a second moving document simplex reading mode, and a moving document duplex reading mode. One of these reading modes is selected by the user through an operation device 23, and the controller 29 causes the image reading apparatus 20 to read the image of the document M, in the selected reading mode.

In the fixed document reading mode, the image on the downwardly oriented front face (face to be read), of the document M placed on the second platen glass 52, is read. In the fixed document reading mode, the CCD sensor 11 of the reading device 32 reads the image on the front face of the document M, through the second platen glass 52.

When the fixed document reading mode is selected, the user opens the document transport device 31, thereby exposing the second platen glass 52 of the reading device 32, and places the document M, with the front face oriented downward, on the second platen glass 52. Then the user closes the document transport device 31, thereby holding the document M placed on the second platen glass 52, with the document transport device 31. The reading device 32 emits the light of the light source 54A of the carriage 54, to the surface of the document M through the second platen glass 52, while moving the carriage 54 and the optical unit 55 in the sub scanning direction X, maintaining the predetermined speed relation between each other. The light reflected by the surface of the document M is reflected by the mirror 54B of the carriage 54. The light reflected by the mirror 54B is reflected by the mirror 55A and the mirror 55B of the optical unit 55, thus to be incident upon the CCD sensor 11, through the condenser lens 56. The CCD sensor 11 repeatedly reads the image on the front face of the document M, in the main scanning direction Y (orthogonal to the sub scanning direction X).

In the first moving document simplex reading mode, the image on the upper face of the document M placed on the document tray 33 (face to be read; corresponding to the "first face of the document" in the disclosure) is read, while the document M is being transported. In the first moving document simplex reading mode, the document M is transported from the document tray 33, through the common transport route 45 and the first transport route 46, and to the first discharge tray 40, so that the CCD sensor 11 of the reading device 32 reads the image on the surface of the document M through the first platen glass 51.

Figure 4:
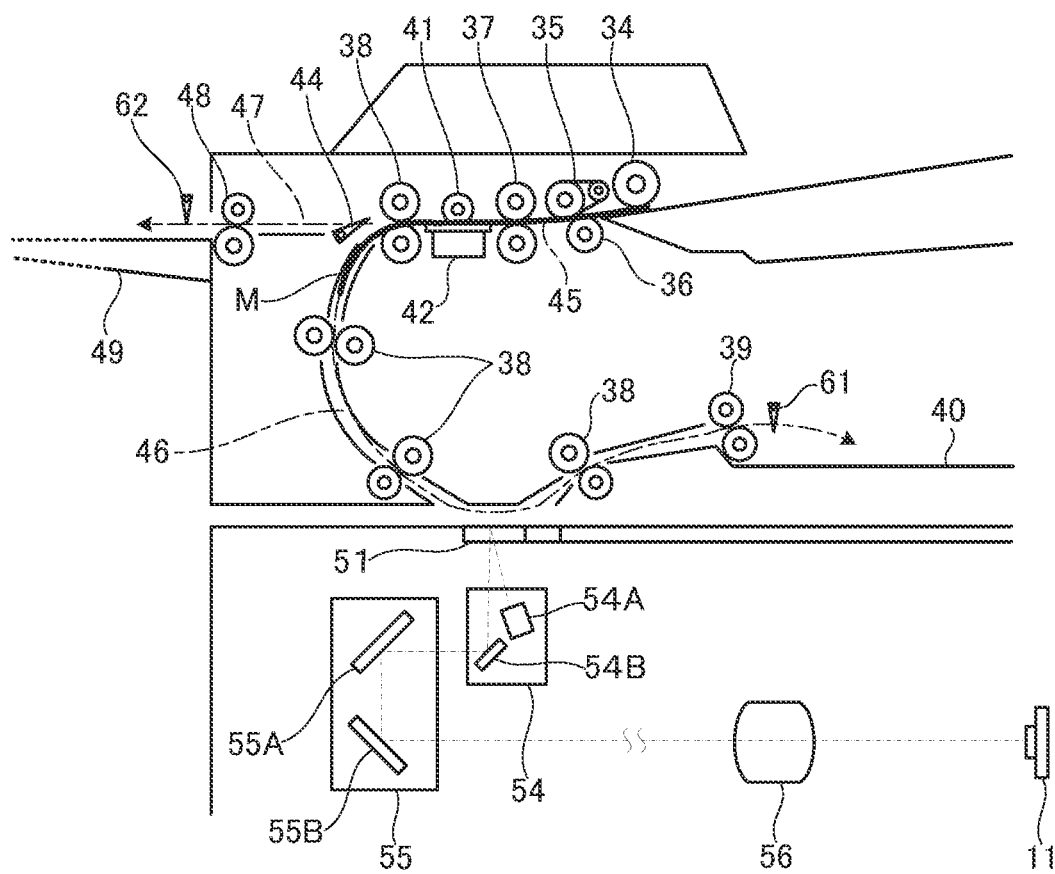
FIG. 4 is an enlarged schematic drawing showing a transport route of a document, in the image reading apparatus according to the first embodiment.

When the first moving document simplex reading mode is selected, the user places the document M with the front face oriented upward, on the document tray 33 with the document transport device 31 kept closed, as shown in FIG. 4. The feeding roller 34 draws out the document M from the document tray 33. The document M is transported through the common transport route 45, guided by the switching claw 44 from the common transport route to the first transport route 46, and passes over the first platen glass 51, thus to be discharged to the first discharge tray 40. The reading device 32 sets the carriage 54 and the optical unit at respective predetermined positions on the lower side of the first platen glass 51, and emits the light of the light source 54A of the carriage 54, to the surface of the document M, through the first platen glass 51. The light reflected by the surface of the document M is sequentially reflected by the mirrors 54B, 55A, and 55B, thus to be incident upon the CCD sensor 11, through the condenser lens 56. The CCD sensor 11 repeatedly reads the image on the surface of the document M, in the main scanning direction Y. The document M is discharged to the first discharge tray 40, by the first discharge roller 39.

In the second moving document simplex reading mode, the image on the downwardly oriented face of the document M placed on the document tray 33 (face to be read; opposite to the face of the document to be read in the first moving document simplex reading mode, and corresponding to the "second face of the document" in the disclosure) is read, while the document M is being transported. In the second moving document simplex reading mode, the document M is transported from the document tray 33, through the common transport route 45 and the second transport route 47, and to the second discharge tray 49, so that the CIS 42 reads the image on the downwardly oriented front face of the document M.

Figure 5:
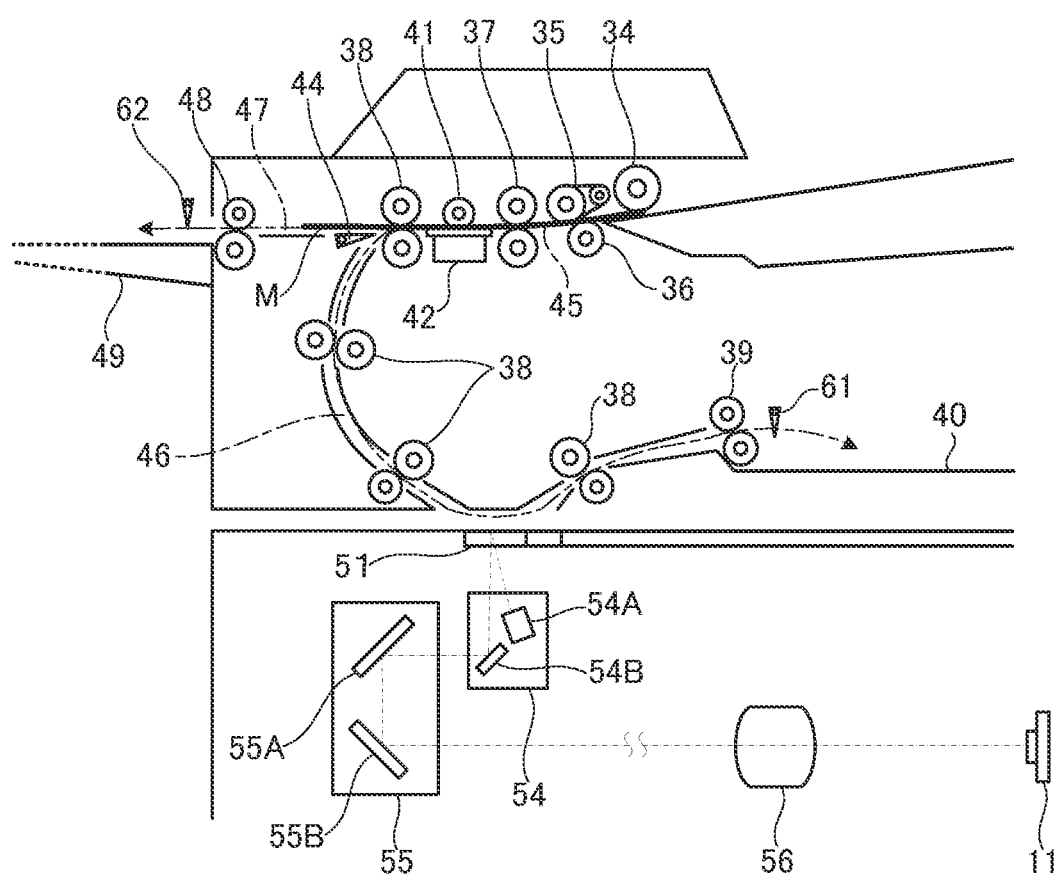
FIG. 5 is an enlarged schematic drawing showing another transport route of the document, in the image reading apparatus according to the first embodiment.

When the second moving document simplex reading mode is selected, the user places the document M with the front face oriented downward, on the document tray 33 with the document transport device 31 kept closed, as shown in FIG. 5. The feeding roller 34 draws out the document M from the document tray 33. The document M is transported through the common transport route 45 past the CIS 42, guided by the switching claw 44 from the common transport route 45 to the second transport route 47, and discharged to the second discharge tray 49. The CIS 42 repeatedly reads the image on the downwardly oriented front face of the document M, passing through between the CIS 42 and the shading roller 41, in the main scanning direction Y.

In the moving document duplex reading mode, the images on the respective faces of the document M placed on the document tray 33 are read, while the document M is being transported. In the moving document duplex reading mode, the document M is transported from the document tray 33, through the common transport route 45 and the first transport route 46, and to the first discharge tray 40, so that the CIS 42 reads the image on the downwardly oriented back face of the document M being transported through the common transport route and the CCD sensor 11 of the reading device 32 reads the image on the front face of the document M, through the first platen glass 51.

When the moving document duplex reading mode is selected, the user places the document M with the front face oriented upward, on the document tray 33 with the document transport device 31 kept closed, as shown in FIG. 4. The feeding roller 34 draws out the document M from the document tray 33. The document M is transported through the common transport route 45 past the CIS 42, guided by the switching claw 44 from the common transport route 45 to the first transport route 46, and passes over the first platen glass 51, thus to be discharged to the first discharge tray 40. The CIS 42 reads the image on the back face, oriented downward, of the document M passing through between the CIS 42 and the shading roller 41. The reading device 32 emits the light of the light source 54A of the carriage 54, to the surface of the document M, through the first platen glass 51. The light reflected by the surface of the document M is sequentially reflected by the mirrors 54B, 55A, and 55B, thus to be incident upon the CCD sensor 11, through the condenser lens 56. The CCD sensor 11 reads the image on the surface of the document M.

Figure 6:
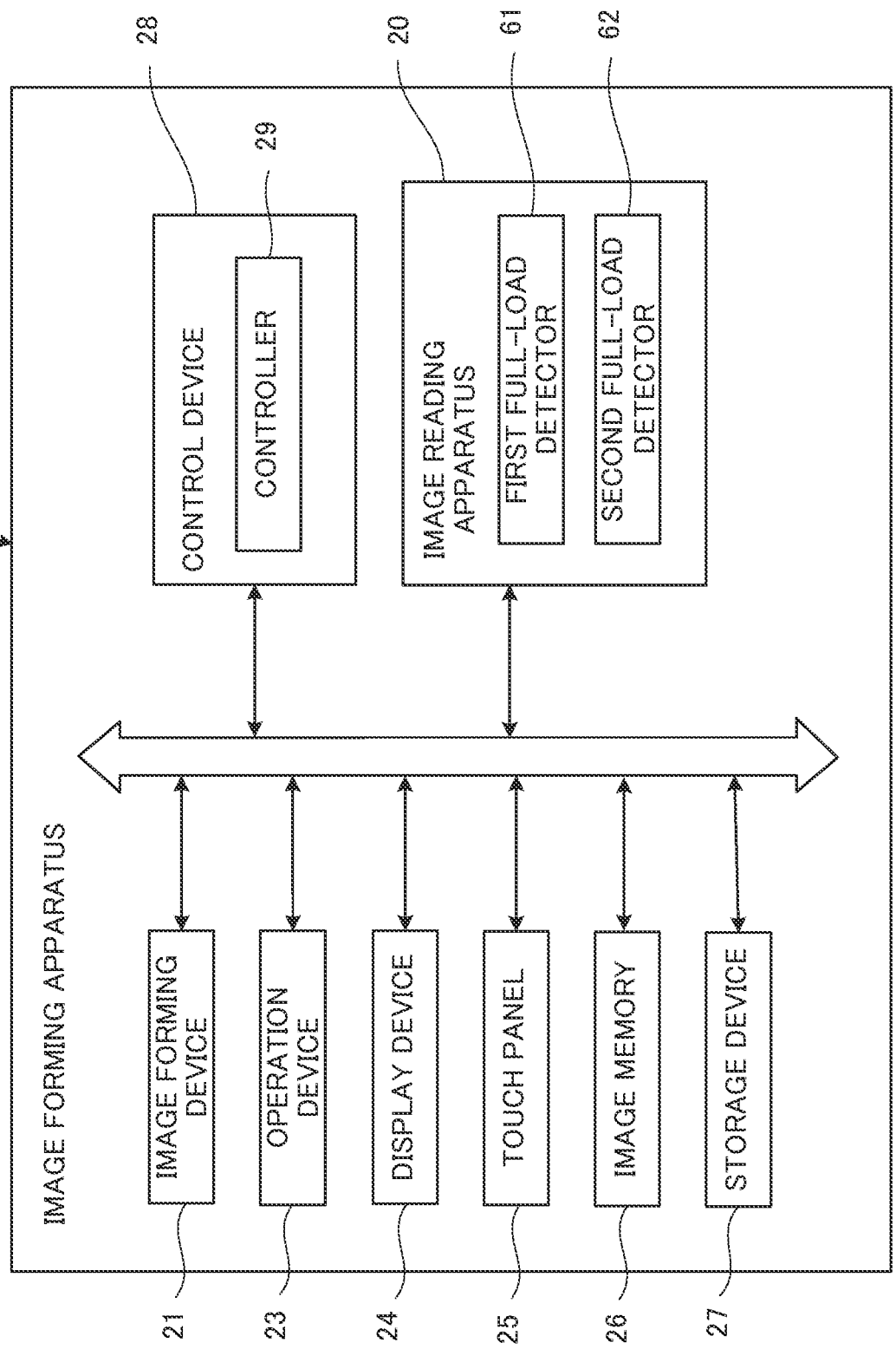
FIG. 6 is a functional block diagram showing an essential internal configuration of the image forming apparatus.

FIG. 6 is a functional block diagram showing an internal configuration of the image forming apparatus 10. As shown in FIG. 6, the image forming apparatus 10 includes the image reading apparatus 20, the image forming device 21, an operation device 23, a display device 24, a touch panel 25, an image memory 26, a storage device 27, and a control device 28. The mentioned components are configured to transmit and receive data and signals to and from each other, via a bus.

The operation device 23 includes physical keys such as a tenkey, an enter key, and a start key. The operation device 23 receives inputs of various instructions from the user. The display device 24 is, for example, constituted of a liquid crystal display (LCD) or an organic light-emitting diode (OLED) display.

The touch panel 25 is overlaid on the screen of the display device 24. The touch panel 25 is based on a resistive film or electrostatic capacitance. The touch panel 25 detects a contact (touch) of the user's finger made thereon, along with the touched position, and outputs a detection signal indicating the coordinate of the touched position, to the controller 29 of the control device 28.

The image memory 26 is for temporarily storing the image data representing the image of the document M, read by the CCD sensor 11 and the second CIS 42 of the image reading apparatus 20.

The storage device 27 is a large-capacity storage device such as a solid-state drive (SSD) or a hard disk drive (HDD). The storage device 27 contains various application programs and various types of data.

The control device 28 includes a processor, a random-access memory (RAM), a read-only memory (ROM), and so forth. The processor is, for example, a central processing unit (CPU), an application specific integrated circuit (ASIC), or a micro processing unit (MPU). The control device 28 serves as the controller 29, when the processor executes a control program stored in the ROM or the storage device 27.

The controller 29 executes overall control of the image forming apparatus 10. The controller 29 is connected to the image reading apparatus 20, the image forming device 21, the operation device 23, the display device 24, the touch panel 25, the image memory 26, and the storage device 27. The controller 29 controls the operation of the components cited above, and transmits and receives signals and data to and from those components.

The controller 29 serves as a processing device that executes various processings necessary for the image forming job by the image forming apparatus 10. The controller 29 accepts instructions to execute the operation, on the basis of a detection signal outputted from the touch panel 25, or an operation of the user performed on the physical key of the operation device 23. For example, the controller 29 accepts a user's touch operation made through the touch panel 25 (acting as the operation device), on a graphical user interface (GUI) displayed on the screen of the display device 24. The controller 29 also controls the displaying operation of the display device 24.

The controller 29 decides whether the first discharge tray 40 is filled up, on the basis of the output from the first full-load detector 61 of the image reading apparatus 20. Likewise, the controller 29 decides whether the second discharge tray 49 is filled up, on the basis of the output from the second full-load detector 62.

The controller 29 controls the motor, the actuator, and a clutch for driving the feeding roller 34, the transport belt 35, the resist roller 37, the transport rollers 38, the shading roller 41, the first discharge roller 39, the second discharge roller 48, and the switching claw 44 in the document transport device 31, thereby operating these components. Through such operation, the controller 29 causes the document M to be drawn out from the document tray 33, and transported through the common transport route 45, and one of the first transport route 46 and the second transport route 47.

To operate the image forming apparatus 10, for example, the user places the document M on the second platen glass 52 of the reading device 32, with the front face, which is the face to be read of the document M, oriented downward. When the user selects the fixed document reading mode through the GUI displayed on the display device 24, and presses the start key on the operation device 23, the controller 29 receives the instruction to read the document in the fixed document reading mode. The controller 29 sets the fixed document reading mode, and controls the reading device 32 in response to the press of the start key, to cause the CCD sensor 11 of the reading device 32 to read the image on the front face of the document M on the second platen glass 52, and to store the image data representing the image on the front face of the document M, in the image memory 26. The controller 29 causes the image forming device 21 to form the image on the front face of the document M, represented by the image data, on the recording sheet P.

For example, the user places the document M on the document tray 33, with the front face, which is the face to be read of the document M, oriented upward. When the user selects the first moving document simplex reading mode through the GUI displayed on the display device 24, and presses the start key on the operation device 23, the controller 29 receives the instruction to read the document in the first moving document simplex reading mode. The controller 29 sets the first moving document simplex reading mode, and controls the document transport device 31 and the reading device 32 in response to the press of the start key, to transport the document M from the document tray 33, through the common transport route 45, and the first transport route 46, and then to the first discharge tray 40 (see FIG. 4). The controller 29 causes the CCD sensor 11 of the reading device 32 to read the image on the front face of the document M through the first platen glass 51, and store the image data representing the image on the front face of the document M, in the image memory 26. The controller 29 causes the image forming device 21 to form the image on the front face of the document M, represented by the image data, on the recording sheet P.

For example, the user places the document M on the document tray 33, with the front face, which is the face to be read of the document M, oriented downward. When the user selects the second moving document simplex reading mode through the GUI displayed on the display device 24, and presses the start key on the operation device 23, the controller 29 receives the instruction to read the document in the second moving document simplex reading mode. The controller 29 sets the second moving document simplex reading mode, and controls the document transport device 31 and the CIS 42 in response to the press of the start key, to transport the document M from the document tray 33, through the common transport route 45 and the second transport route 47, and then to the second discharge tray 49 (see FIG. 5). The controller 29 causes the CIS 42 to read the image on the downwardly oriented front face of the document M, and store the image data representing the image on the front face of the document M, in the image memory 26. The controller 29 causes the image forming device 21 to form the image on the front face of the document M, represented by the image data, on the recording sheet P.

For example, the user places the document M on the document tray 33, with the front face (the face regarded as the first page, of the both faces) oriented upward. When the user selects the moving document duplex reading mode through the GUI displayed on the display device 24, and presses the start key on the operation device 23, the controller 29 receives the instruction to read the document in the moving document duplex reading mode. The controller 29 sets the moving document duplex reading mode, and controls the document transport device 31, the CIS 42, and the reading device 32 in response to the press of the start key, to transport the document M from the document tray 33, through the common transport route 45, and the first transport route 46, and then to the first discharge tray 40 (see FIG. 4). The controller 29 causes the CIS 42 to read the image on the downwardly oriented back face (the face regarded as the second page, of the both faces) of the document M, causes the CCD sensor 11 of the reading device 32 to read the image on the front face of the document M, through the first platen glass 51, and stores the image data respectively representing the image on the front face and on the back face of the document M, in the image memory 26. The controller 29 causes the image forming device 21 to form the images on the front face and the back face of the document M, respectively represented by the image data, on the front and back faces of the recording sheet P.

The controller 29 decides whether the first discharge tray 40 is full, on the basis of the output from the sensor of the first full-load detector 61. Upon deciding that the first discharge tray 40 is full, the controller 29 restricts the document M from being discharged to the first discharge tray 40. Likewise, the controller 29 decides whether the second discharge tray 49 is full, on the basis of the output from the sensor of the second full-load detector 62, and restricts the document M from being discharged to the second discharge tray 49, upon deciding that the second discharge tray 49 is full.

Thus, the controller 29 decides whether the transport and reading of the document is to be restricted, with respect to each of the plurality of transport routes. Accordingly, the user can immediately resume the transport and reading of the document, using the transport route the use of which is not inhibited. Such an arrangement according to the first embodiment contributes, therefore, to improving the reading efficiency of the image of the document, for example in the case of a trouble related to the transport of the document.

For example, in the case where the reading of the document M is entirely suspended, because of the restriction on the discharge of the document M to either of the first discharge tray 40 and the second discharge tray 49, the reading efficiency of the image of the document M is degraded.

Now, in the case of the aforementioned existing automatic document feeder, the number of the documents is counted each time the document is discharged to the discharge tray, and the drawing out of the document from the document tray, and the reading of the image of the document are suspended, when the document is restricted from being discharged to the discharge tray, because of the counted number of documents having reached the upper-limit of the number.

However, in the case of the image reading apparatus configured to read the image of the document, while transporting the document, drawn out from the document tray, through one of the plurality of transport routes, and discharge the document from the used transport route to the corresponding discharge tray, the suspension of the reading of the image of the document can be avoided, even though the document is restricted from being discharged to the discharge tray, by reading the image of the document while transporting the document through another transport route, and discharging the document to the discharge tray corresponding to the other transport route.

According to the first embodiment, therefore, in the case of executing the document reading operation in the second moving document simplex reading mode, the controller 29 causes the CIS 42 to read the image on the front face of the document M, while transporting the document M placed on the document tray 33, with the front face oriented downward. Upon deciding that the second discharge tray 49 is full, when the document M is to be discharged to the second discharge tray 49, the controller 29 restricts the document M from being discharged to the second discharge tray 49, and inhibits and suspends the document reading operation in the second moving document simplex reading mode. The controller 29 then causes the feeding roller 34 to draw out the document M from the document tray 33, causes the CIS 42 to read the image on the downwardly oriented front face of the document M, and causes the switching claw 44 to guide the document M from the common transport route 45 to the first transport route 46, so that the document M is discharged to the first discharge tray 40. Such an arrangement enables the images on the downwardly oriented front face of the respective documents M on the document tray 33 to be successively read, even though the document M is restricted from being discharged to the second discharge tray 49.

When executing the document reading operation in the moving document duplex reading mode, the controller 29 causes the CIS 42 and the CCD sensor 11 of the reading device 32 to read the images on the respective faces of the document M, while transporting the document M from the document tray 33. Upon deciding that the first discharge tray 40 is full, when the document M is to be discharged to the first discharge tray 40, the controller 29 restricts the document M from being discharged to the first discharge tray 40, and inhibits and suspends the document reading operation in the moving document duplex reading mode. The controller 29 then executes the document reading operation in the second moving document simplex reading mode, including causing the feeding roller 34 to draw out the document M from the document tray 33, causing the CIS 42 to read the image on the downwardly oriented front face of the document M, and causing the switching claw 44 to guide the document M from the common transport route 45 to the second transport route 47, so that the document M is discharged to the second discharge tray.

When the user places the document M discharged to the second discharge tray 49 on the document tray 33, with the front and back faces reversed, and presses the start key on the operation device 23, the controller 29 executes the document reading operation in the second moving document simplex reading mode, including causing the feeding roller 34 to draw out the document M, the front and back faces of which has been reversed, from the document tray 33, causing the CIS 42 to read the downwardly oriented front face of the document M (opposite to the "back face" read first), being transported through the common transport route 45 with the front and back faces reversed. Then the controller 29 causes the switching claw 44 to guide the document M from the common transport route 45 to the second transport route 47, so that the document M is discharged to the second discharge tray.

The mentioned arrangement enables the images on the respective faces of the document M on the document tray 33 to be successively read, even though the document M is restricted from being discharged to the first discharge tray 40. In this case, the controller 29 stores all the images on the respective faces of each of the documents in the image memory 26, and rearranges the order of the images on the basis of the order of reading and the order of front and back faces, in other words according to a rule that an image read earlier comes to a higher place, and that the image of the front face comes to a higher place than that of the back face. For example, the controller 29 generates a file representing the document images rearranged according to the mentioned rule, or causes the image forming device 21 to form the document images, in the rearranged order.

When executing the document reading operation in the first moving document simplex reading mode, the controller 29 causes the CCD sensor 11 of the reading device 32 to read the image on the front face of the document M, while transporting the document M placed on the document tray 33 with the front face oriented upward. Upon deciding that the first discharge tray 40 is full, when the document M is to be discharged to the first discharge tray 40, the controller 29 restricts the document M from being discharged to the first discharge tray 40, and inhibits and suspends the document reading operation in the first moving document simplex reading mode. When the user removes the documents M from the first discharge tray 40, and presses the start key on the operation device 23, the controller 29 decides that the first discharge tray 40 is no longer full, allows the document M to be discharged to the first discharge tray 40, and resumes the document reading operation in the first moving document simplex reading mode.

Referring now to a flowchart shown in FIG. 7, a control process of a discharge destination switching operation executed by the image reading apparatus 20 will be described hereunder in detail. This operation is executed when the document M is restricted from being discharged to the first discharge tray 40 or the second discharge tray 49, while the document reading operation is being executed in the first moving document simplex reading mode, the second moving document simplex reading mode, or the moving document duplex reading mode.

The controller 29 decides, while executing the document reading operation, which of the first moving document simplex reading mode, the second moving document simplex reading mode, and the moving document duplex reading mode is being executed (step S101).

Upon deciding that the second moving document simplex reading mode is being executed ("Second" at step S101), the controller 29 continues with the document reading operation, in the second moving document simplex reading mode (step S102). In this case, since the document M is discharged to the second discharge tray 49, the controller 29 decides whether the second discharge tray 49 is full, on the basis of the output from the sensor of the second full-load detector 62 (step S103).

Upon deciding that the second discharge tray 49 is not full (No at step S103), the controller 29 continues with the document reading operation, in the second moving document simplex reading mode (step S102). The controller 29 repeatedly decides whether the second discharge tray 49 is full, on the basis of the output from the sensor of the second full-load detector 62 (step S103). In this case, the document M, placed on the document tray 33 with the front face oriented downward, is transported from the document tray 33, through the common transport route 45 and the second transport route 47, and to the second discharge tray 49. Each time the document M is transported as above, the CIS 42 reads the image on the downwardly oriented front face of the document M, being transported through the common transport route 45, and the image data representing the image on the front face of the document M is stored in the image memory 26. The image forming device 21 forms the image on the front face of the document M, represented by the image data, on the recording sheet P.

Upon deciding that the second discharge tray 49 is full (Yes at step S103), the controller 29 restricts the document M from being discharged to the second discharge tray 49, and inhibits and suspends the document reading operation in the second moving document simplex reading mode (step S104). The controller 29 then causes the feeding roller 34 to draw out the document M from the document tray 33, causes the CIS 42 to read the image on the downwardly oriented front face of the document M, being transported through the common transport route 45, and causes the switching claw 44 to guide the document M from the common transport route 45 to the first transport route 46, so that the document M is discharged to the first discharge tray 40 (step S105). In this case, the document M is transported from the document tray 33, through the common transport route 45 and the first transport route 46, and to the first discharge tray 40. Each time the document M is transported as above, the CIS 42 reads the image on the downwardly oriented front face of the document M, being transported through the common transport route 45, and the image data representing the image on the front face of the document M is stored in the image memory 26. Then the image forming device 21 forms the image on the front face of the document M, represented by the image data, on the recording sheet P.

Therefore, the images on the front face of the respective documents M on the document tray 33 are successively read, and the documents M are discharged to the first discharge tray 40, even though the document M is restricted from being discharged to the second discharge tray 49, and the second moving document simplex reading mode is inhibited.

In contrast, upon deciding that the moving document duplex reading mode is being executed ("Duplex" at step S101), the controller 29 continues with the document reading operation, in the moving document duplex reading mode (step S106). In this case, since the document M is discharged to the first discharge tray 40, the controller 29 decides whether the first discharge tray 40 is full, on the basis of the output from the sensor of the first full-load detector 61 (step S107).

Upon deciding that the first discharge tray 40 is not full (No at step S107), the controller 29 continues with the document reading operation, in the moving document duplex reading mode (step S106). The controller 29 repeatedly decides whether the first discharge tray 40 is full, on the basis of the output from the sensor of the first full-load detector 61 (step S107). In this case, the document M is transported from the document tray 33, through the common transport route 45 and the first transport route 46, and to the first discharge tray 40. Each time the document M is transported as above, the CIS 42 reads the image on the downwardly oriented back face of the document M, being transported through the common transport route 45, and the CCD sensor 11 of the reading device 32 reads the image on the front face of the document M, through the first platen glass 51. The image data representing the images on the front face and the back face of the document M is stored in the image memory 26. Then the image forming device 21 forms the images on the front face and the back face of the document M, represented by the image data, on the front and back faces of the recording sheet P, respectively.

Upon deciding, in contrast, that the first discharge tray 40 is full (Yes at step S107), the controller 29 restricts the document M from being discharged to the first discharge tray 40, and inhibits and suspends the document reading operation in the moving document duplex reading mode (step S108). The controller 29 then executes the document reading operation in the second moving document simplex reading mode, including causing the feeding roller 34 to draw out the document M from the document tray 33, causing the CIS 42 to read the image on the downwardly oriented back face of the document M, storing the image data representing the image on the back face of the document M in the image memory 26, and causing the switching claw 44 to guide the document M from the common transport route 45 to the second transport route 47, so that the document M is discharged to the second discharge tray 49 (step S109).

When a document sensor detects that no document M is on the document tray 33, the controller 29 suspends the document reading operation in the second moving document simplex reading mode, and causes the display device 24 to display a message urging the user to place the document M discharged to the second discharge tray 49 on the document tray 33, with the front and back faces reversed, and to press the start key on the operation device 23 (step S110). In view of the message, the user places the document M discharged to the second discharge tray 49 on the document tray 33, with the front and back faces reversed, and presses the start key on the operation device 23.

When the user presses the start key on the operation device 23, the controller 29 receives the instruction to read the document in the second moving document simplex reading mode. Then the controller 29 executes the document reading operation in the second moving document simplex reading mode, including causing the feeding roller 34 to draw out the document M, the front and back faces of which have been reversed, from the document tray 33, causing the CIS 42 to read the image on the front face of the document M, the front and back faces of which have been reversed, storing the image data representing the image on the front face of the document M in the image memory 26, and causing the switching claw 44 to guide the document M from the common transport route 45 to the second transport route 47, so that the document M is discharged to the second discharge tray 49 (step S111).

Accordingly, the document M is transported from the document tray 33, through the common transport route 45 and the first transport route 46, and to the first discharge tray 40, until immediately before the first discharge tray 40 becomes full. Each time the document M is transported as above, the CIS 42 reads the image on the downwardly oriented back face of the document M, being transported through the common transport route 45, and the CCD sensor 11 of the reading device 32 reads the image on the front face of the document M, through the first platen glass 51. Then the image forming device 21 forms the images on the front face and the back face of the document M, on the front and back faces of the recording sheet P, respectively.

When the first discharge tray 40 becomes full, the CIS 42 reads the image on the back face of the document M oriented downward at step S109, the image data representing the image on the back face of the document M is stored in the image memory 26, and the document M is discharged to the second discharge tray 49. Further, the CIS 42 reads the image on the downwardly oriented front face of the document M, the front and back faces of which have been reversed, at step S111, the image data representing the image on the front face of the document M is stored in the image memory 26, and the document M is discharged to the second discharge tray 49. The controller 29 sequentially selects the image data stored in the image memory 26, and representing each of the images on the front face of the documents M, in the order reverse to the order of storage of the image data, and sequentially selects the image data stored in the image memory 26, and representing each of the images on the back face of the documents M, in the order reverse to the order of storage of the image data. Then the controller 29 combines the image data representing the image on the front face of the document M, with the image data representing the image on the back face of the same document M. The controller 29 causes the image forming device 21 to sequentially form the document images (images on the front face and the back face of the document M) based on the combination, in the order in which the documents were read, on the front and back faces of the recording sheet P, respectively. Here, the controller 29 may generate one file representing the document images based on the mentioned combination.

Consequently, the images on the front face and the back face of the documents M on the document tray 33 are successively read, and the documents M are discharged to the second discharge tray 49, even though the document M is restricted from being discharged to the first discharge tray 40, and the moving document duplex reading mode is inhibited.

Upon deciding that the first moving document simplex reading mode is being executed ("First" at step S101), the controller 29 continues with the document reading operation in the first moving document simplex reading mode (step S112). In this case, since the document M is discharged to the first discharge tray 40, the controller 29 decides whether the first discharge tray 40 is full, on the basis of the output from the sensor of the first full-load detector 61 (step S113).

Upon deciding that the first discharge tray 40 is not full (No at step S113), the controller 29 continues with the document reading operation, in the first moving document simplex reading mode (step S112). In this case, the document M is transported from the document tray 33, through the common transport route 45 and the second transport route 47, and to the first discharge tray 40. Each time the document M is transported as above, the CCD sensor 11 of the reading device 32 reads the image on the front face of the document M through the first platen glass 51, and the image data representing the image on the front face of the document M is stored in the image memory 26. The image forming device 21 forms the image on the front face of the document M, represented by the image data, on the recording sheet P.

Upon deciding that the first discharge tray 40 is full (Yes at step S113), the controller 29 restricts the document M from being discharged to the first discharge tray 40, and inhibits and suspends the document reading operation in the first moving document simplex reading mode (step S114).

The controller 29 causes the display device 24 to display a message urging the user to remove the documents M discharged to the first discharge tray 40. When the user removes the documents M discharged to the first discharge tray 40, in view of the message, and presses the start key on the operation device 23, the controller 29 receives the instruction to read the document in the first moving document simplex reading mode.

Upon confirming that the first discharge tray 40 is not full, on the basis of the output from the sensor of the first full-load detector 61 (step S115), the controller 29 again executes the document reading operation in the first moving document simplex reading mode (step S116).

According to the first embodiment, as described above, the documents M are successively read, even though the document M is restricted from being discharged to the first discharge tray 40 or the second discharge tray 49, and therefore the reading efficiency of the image of the document M can be prevented from being degraded.

Second Embodiment

Figure 8:
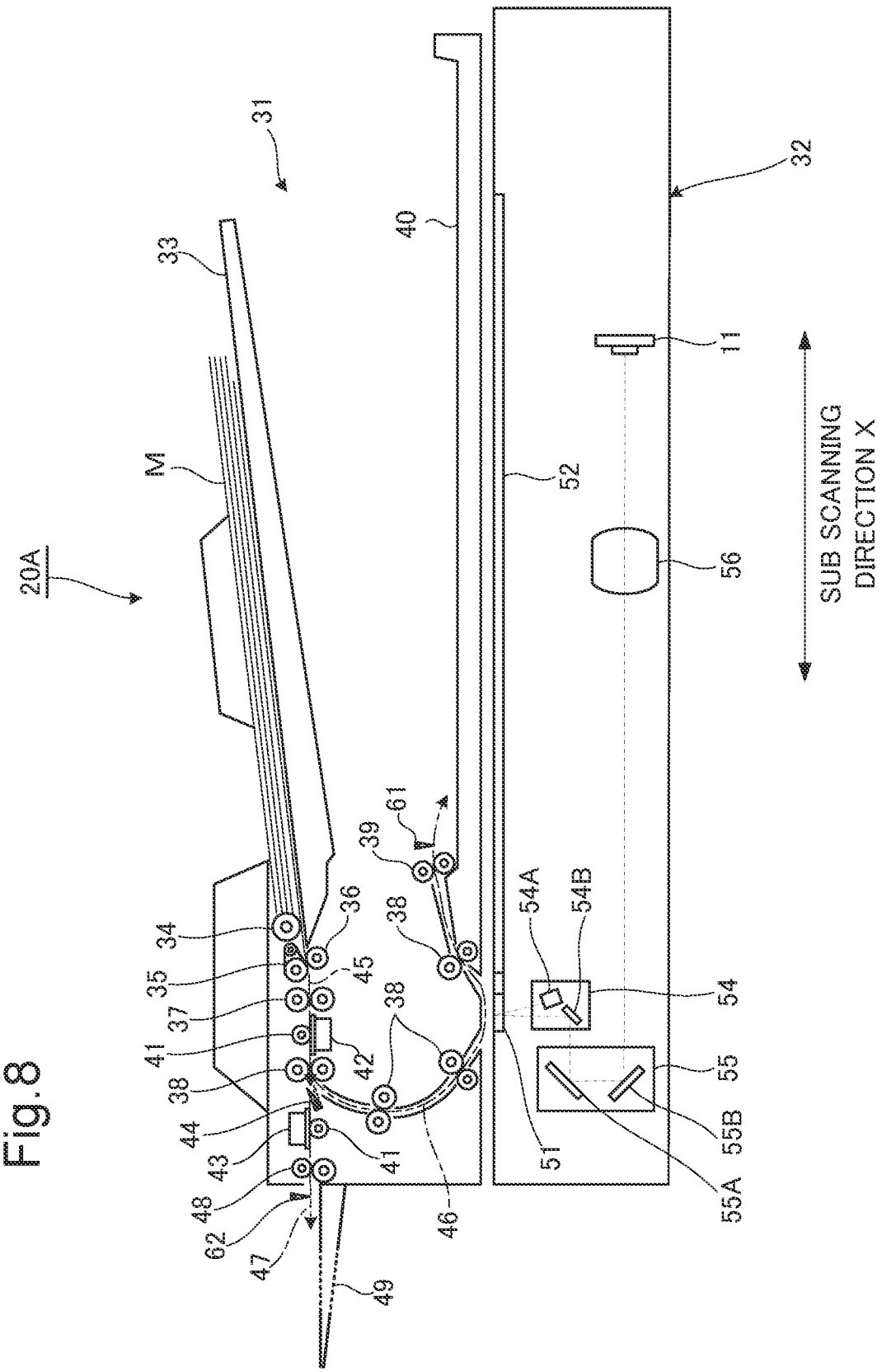
FIG. 8 is a cross-sectional view showing an image reading apparatus according to a second embodiment.

FIG. 8 is a cross-sectional view showing an image reading apparatus 20A according to a second embodiment of the disclosure. The image reading apparatus 20A is different from the image reading apparatus 20 according to the first embodiment, in including another contact image sensor (CIS) 43.

The contact image sensor 43 corresponds to the third image sensor in the disclosure. Hereinafter, the contact image sensor 43 will be referred to as CIS 43.

The CIS 43 is provided on the second transport route 47. The CIS 43 reads the image on the upwardly oriented face of the document M, passing through between the CIS 43 and the shading roller 41.

The image reading apparatus 20A can, like the image reading apparatus 20 according to the first embodiment, be incorporated in the image forming apparatus 10 shown in FIG. 1 and FIG. 6. Each of the components of the image reading apparatus 20A is controlled by the controller 29.

The image reading apparatus 20A is configured to execute five reading modes under the control of the controller 29, namely the fixed document reading mode, the first moving document simplex reading mode, a third moving document simplex reading mode, a first moving document duplex reading mode, and a second moving document duplex reading mode, to read the image of the document M.

In the fixed document reading mode, the user places the document M, with the front face, which is the face to be read, oriented downward, on the second platen glass 52, as in the first embodiment. The CCD sensor 11 of the reading device 32 reads, under the control of the controller 29, the image on the front face of the document M oriented downward, through the second platen glass 52.

Figure 9:
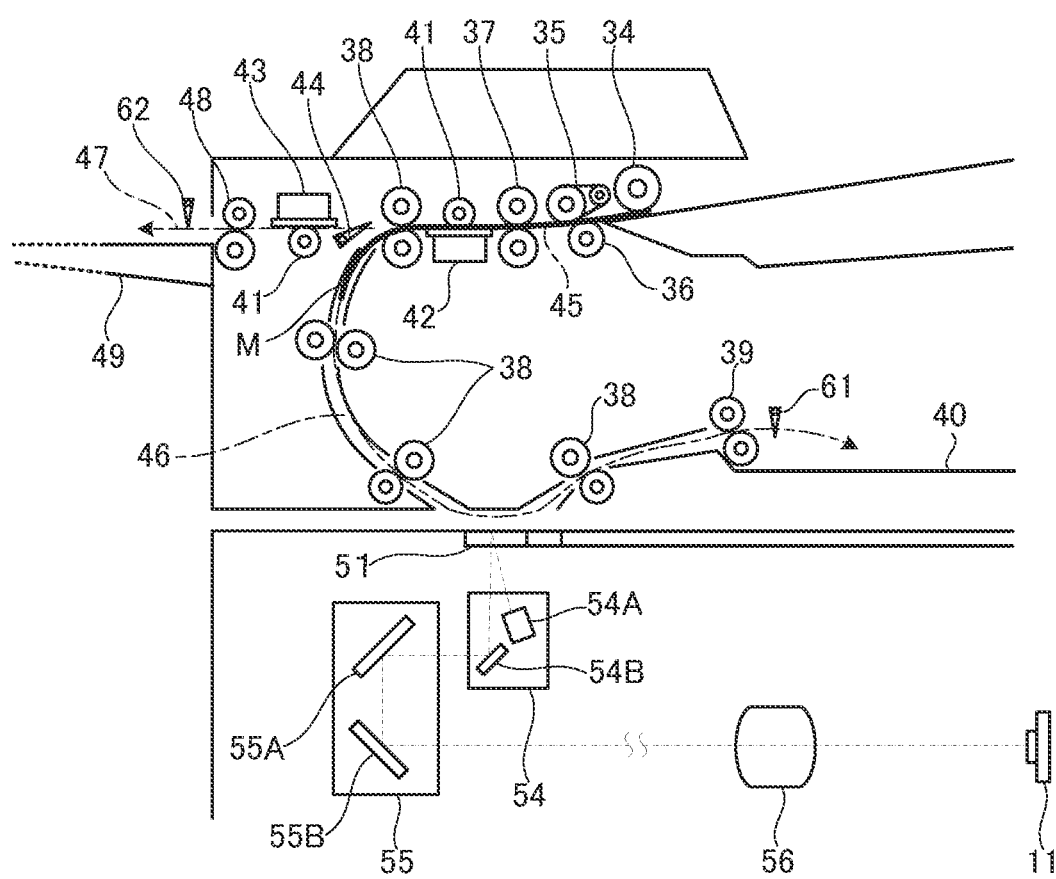
FIG. 9 is an enlarged schematic drawing showing a transport route of the document, in the image reading apparatus according to the second embodiment.

In the first moving document simplex reading mode, the user places the document M, with the front face, which is the face to be read, oriented upward, on the document tray 33. The document M is transported, as shown in FIG. 9, from the document tray 33, through the common transport route 45 and the first transport route 46, and to the first discharge tray 40. The CCD sensor 11 of the reading device 32 reads the image on the front face of the document M, through the first platen glass 51.

Figure 10:
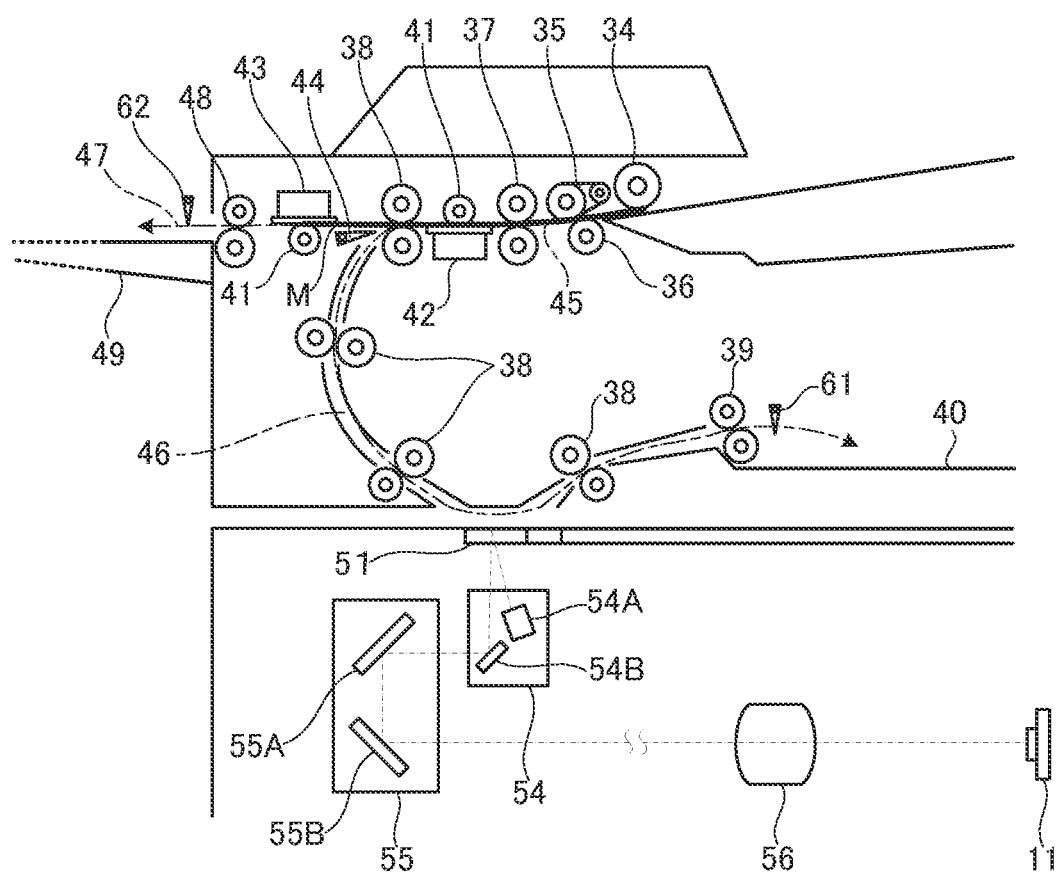
FIG. 10 is an enlarged schematic drawing showing another transport route of the document, in the image reading apparatus according to the second embodiment.

In the third moving document simplex reading mode, the user places the document M, with the front face, which is the face to be read, oriented upward, on the document tray 33. The document M is transported, as shown in FIG. 10, from the document tray 33, through the common transport route 45 and the second transport route 47, and to the second discharge tray 49. The CIS 43 reads the image on the upwardly oriented front face of the document M, passing through between the CIS 43 and the shading roller 41.

In the first moving document duplex reading mode, the user places the document M, with the front face oriented upward, on the document tray 33. The document M is transported, as shown in FIG. 9, from the document tray 33, through the common transport route 45 and the first transport route 46, and to the first discharge tray 40. The CIS 42 reads the image on the back face of the document M, passing through between the CIS 42 and the shading roller 41. The CCD sensor 11 of the reading device 32 reads the image on the front face of the document M, through the first platen glass 51.

In the second moving document duplex reading mode, the user places the document M, with the front face oriented upward, on the document tray 33. The document M is transported, as shown in FIG. 10, from the document tray 33, through the common transport route 45 and the second transport route 47, and to the second discharge tray 49. The CIS 42 reads the image on the downwardly oriented back face of the document M, passing through between the CIS 42 and the shading roller 41. The CIS 43 reads the image on the upwardly oriented front face of the document M, passing through between the CIS 43 and the shading roller 41.

In the second embodiment, when executing the document reading operation in the first moving document simplex reading mode, the controller 29 causes the CCD sensor 11 of the reading device 32 to read the image on the front face of the document M, while transporting the document M placed on the document tray 33, with the front face oriented upward. In the case where the first discharge tray 40 becomes full, when the document M is to be discharged to the first discharge tray 40, the controller 29 restricts the document M from being discharged to the first discharge tray 40, and inhibits and suspends the document reading operation in the first moving document simplex reading mode. The controller 29 then executes the document reading operation in the third moving document simplex reading mode, including causing the CIS 43 to read the image on the front face of the document M, while transporting the document M, and discharging the document M to the second discharge tray 49.

When executing the document reading operation in the third moving document simplex reading mode, the controller 29 causes the CIS 43 to read the image on the front face of the document M, while transporting the document M placed on the document tray 33, with the front face oriented upward. In the case where the second discharge tray 49 becomes full, when the document M is to be discharged to the second discharge tray 49, the controller 29 restricts the document M from being discharged to the second discharge tray 49, and inhibits and suspends the document reading operation in the third moving document simplex reading mode. The controller 29 then executes the document reading operation in the first moving document simplex reading mode, including causing the CCD sensor 11 of the reading device 32 to read the image on the front face of the document M, while transporting the document M, and discharging the document M to the first discharge tray 40.

When executing the document reading operation in the first moving document duplex reading mode, the controller 29 transports the document M placed on the document tray 33 with the front face oriented upward, causes the CIS 42 to read the image on the back face of the document M, and causes the CCD sensor 11 of the reading device 32 to read the image on the front face of the document M. In the case where the first discharge tray 40 becomes full, when the document M is to be discharged to the first discharge tray 40, the controller 29 restricts the document M from being discharged to the first discharge tray 40, and inhibits and suspends the document reading operation in the first moving document duplex reading mode. The controller 29 then executes the document reading operation in the second moving document duplex reading mode, including transporting the document M, causing the CIS 42 to read the image on the back face of the document M, causing the CIS 43 to read the image on the front face of the document M, and discharging the document M to the second discharge tray 49.

When executing the document reading operation in the second moving document duplex reading mode, the controller 29 transports the document M placed on the document tray 33 with the front face oriented upward, causes the CIS 42 to read the image on the back face of the document M, and causes the CIS 43 to read the image on the front face of the document M. In the case where the second discharge tray 49 becomes full, when the document M is to be discharged to the second discharge tray 49, the controller 29 restricts the document M from being discharged to the second discharge tray 49, and inhibits and suspends the document reading operation in the second moving document duplex reading mode. The controller 29 then executes the document reading operation in the first moving document duplex reading mode, including transporting the document M, causing the CIS 42 to read the image on the back face of the document M, causing the CCD sensor 11 of the reading device 32 to read the image on the front face of the document M, and discharging the document M to the first discharge tray 40.

The mentioned arrangement enables the images on the documents M on the document tray 33 to be successively read, even though the document M is restricted from being discharged to the first discharge tray 40.

Referring now to a flowchart shown in FIG. 11, a control process of the discharge destination switching operation executed by the image reading apparatus 20A will be described hereunder in detail. This operation is executed when the document M is restricted from being discharged to the first discharge tray 40 or the second discharge tray 49, while the document reading operation is being executed in the first moving document simplex reading mode, the third moving document simplex reading mode, the first moving document duplex reading mode, or the second moving document duplex reading mode.

The controller 29 decides, while executing the document reading operation, which of the first moving document simplex reading mode, the third moving document simplex reading mode, the first moving document duplex reading mode, and the second moving document duplex reading mode is being executed (step S201).

Upon deciding, for example, that the first moving document simplex reading mode is being executed ("First Simplex" at step S201), the controller 29 continues with the document reading operation in the first moving document simplex reading mode (step S202). In this case, since the document M is discharged to the first discharge tray 40, the controller 29 decides whether the first discharge tray 40 is full, on the basis of the output from the sensor of the first full-load detector 61 (step S203).

Upon deciding that the first discharge tray 40 is not full (No at step S203), the controller 29 continues with the document reading operation, in the first moving document simplex reading mode (step S202). The controller 29 repeatedly decides whether the first discharge tray 40 is full (step S203). In this case, the document M, placed on the document tray 33 with the front face oriented upward, is transported from the document tray 33, through the common transport route 45 and the first transport route 46, and to the first discharge tray 40. Each time the document M is transported as above, the CCD sensor 11 of the reading device 32 reads the image on the front face of the document M through the first platen glass 51, and the image data representing the image on the front face of the document M is stored in the image memory 26. Then the image forming device 21 forms the image on the front face of the document M, represented by the image data, on the recording sheet P.

Upon deciding, in contrast, that the first discharge tray 40 is full (Yes at step S203), the controller 29 restricts the document M from being discharged to the first discharge tray 40, and inhibits and suspends the document reading operation in the first moving document simplex reading mode (step S204). The controller 29 then executes the document reading operation in the third moving document simplex reading mode, including causing the CIS 43 to read the image on the front face of the document M, while transporting the document M placed on the document tray 33 with the front face oriented upward, and discharging the document M to the second discharge tray 49 (step S205). In this case, the document M is transported from the document tray 33, through the common transport route 45 and the second transport route 47, and to the second discharge tray 49. Each time the document M is transported as above, the CIS 43 reads the image on the upwardly oriented front face of the document M, being transported through the second transport route 47, and the image data representing the image on the front face of the document M is stored in the image memory 26. Then the image forming device 21 forms the image on the front face of the document M, represented by the image data, on the recording sheet P.

Consequently, the images on the front face of the documents M on the document tray 33 are successively read, and the documents M are discharged to the second discharge tray 49, through the execution of the third moving document simplex reading mode, even though the document M is restricted from being discharged to the first discharge tray 40, and the first moving document simplex reading mode is inhibited.

Upon deciding that the third moving document simplex reading mode is being executed ("Third Simplex" at step S201), the controller 29 continues with the document reading operation in the third moving document simplex reading mode (step S206). In this case, since the document M is discharged to the second discharge tray 49, the controller 29 decides whether the second discharge tray 49 is full, on the basis of the output from the sensor of the second full-load detector 62 (step S207).

Upon deciding that the second discharge tray 49 is not full (No at step S207), the controller 29 continues with the document reading operation, in the third moving document simplex reading mode (step S206). The controller 29 repeatedly decides whether the second discharge tray 49 is full (step S207). In this case, the document M, placed on the document tray 33 with the front face oriented upward, is transported from the document tray 33, through the common transport route 45 and the second transport route 47, and to the second discharge tray 49. Each time the document M is transported as above, the CIS 43 reads the image on the upwardly oriented front face of the document M, being transported through the second transport route 47, and the image data representing the image on the front face of the document M is stored in the image memory 26. The image forming device 21 forms the image on the front face of the document M, represented by the image data, on the recording sheet P.

Upon deciding that the second discharge tray 49 is full (Yes at step S207), the controller 29 restricts the document M from being discharged to the second discharge tray 49, and inhibits and suspends the document reading operation in the third moving document simplex reading mode (step S208). The controller 29 then executes the document reading operation in the first moving document simplex reading mode, including transporting the document M placed on the document tray 33 with the front face oriented upward, causing the CCD sensor 11 of the reading device 32 to read the image on the front face of the document M, and discharging the document M to the first discharge tray 40 (step S209). In this case, the document M is transported from the document tray 33, through the common transport route 45 and the first transport route 46, and to the first discharge tray 40. Each time the document M is transported as above, the CCD sensor 11 of the reading device 32 reads the image on the front face of the document M, through the first platen glass 51, and the image data representing the image on the front face of the document M is stored in the image memory 26. Then the image forming device 21 forms the image on the front face of the document M, represented by the image data, on the recording sheet P.

Consequently, the images on the front face of the documents M on the document tray 33 are successively read, and the documents M are discharged to the first discharge tray 40, through the execution of the first moving document simplex reading mode, even though the document M is restricted from being discharged to the second discharge tray 49, and the third moving document simplex reading mode is inhibited.

Upon deciding that the first moving document duplex reading mode is being executed ("First Duplex" at step S201), the controller 29 continues with the document reading operation, in the first moving document duplex reading mode (step S210). In this case, since the document M is discharged to the first discharge tray 40, the controller 29 decides whether the first discharge tray 40 is full, on the basis of the output from the sensor of the first full-load detector 61 (step S211).

Upon deciding that the first discharge tray 40 is not full (No at step S211), the controller 29 continues with the document reading operation, in the first moving document duplex reading mode (step S210). The controller 29 repeatedly decides whether the first discharge tray 40 is full (step S211). In this case, the document M, placed on the document tray 33 with the front face oriented upward, is transported from the document tray 33, through the common transport route 45 and the first transport route 46, and to the first discharge tray 40. Each time the document M is transported as above, the CIS 42 reads the image on the downwardly oriented back face of the document M, being transported through the common transport route 45, and the CCD sensor 11 of the reading device 32 reads the image on the front face of the document M, through the first platen glass 51. The image data representing the images on the front face and the back face of the document M is stored in the image memory 26. Then the image forming device 21 forms the images on the front face and the back face of the document M, represented by the image data, on the front and back faces of the recording sheet P, respectively.

Upon deciding, in contrast, that the first discharge tray 40 is full (Yes at step S211), the controller 29 restricts the document M from being discharged to the first discharge tray 40, and inhibits and suspends the document reading operation in the first moving document duplex reading mode (step S212). The controller 29 then executes the document reading operation in the second moving document duplex reading mode, including transporting the document M placed on the document tray 33 with the front face oriented upward, causing the CIS 42 to read the image on the back face of the document M, causing the CIS 43 to read the image on the front face of the document M, and discharging the document M to the second discharge tray 49 (step S213). In this case, the document M is transported from the document tray 33, through the common transport route 45 and the second transport route 47, and to the second discharge tray 49. Each time the document M is transported as above, the CIS 42 reads the image on the downwardly oriented back face of the document M, being transported through the common transport route 45, and the CIS 43 reads the image on the upwardly oriented front face of the document M, being transported through the second transport route 47. The image data representing the images on the front face and the back face of the document M is stored in the image memory 26. Then the image forming device 21 forms the images on the front face and the back face of the document M, represented by the image data, on the front and back faces of the recording sheet P, respectively.

Consequently, the images on the front face and the back face of the documents M on the document tray 33 are successively read, and the documents M are discharged to the second discharge tray 49, through the execution of the second moving document duplex reading mode, even though the document M is restricted from being discharged to the first discharge tray 40, and the first moving document duplex reading mode is inhibited.

Upon deciding that the second moving document duplex reading mode is being executed ("Second Duplex" at step S201), the controller 29 continues with the document reading operation in the second moving document duplex reading mode (step S214). In this case, since the document M is discharged to the second discharge tray 49, the controller 29 decides whether the second discharge tray 49 is full, on the basis of the output from the sensor of the second full-load detector 62 (step S215).

Upon deciding that the second discharge tray 49 is not full (No at step S215), the controller 29 continues with the document reading operation, in the second moving document duplex reading mode (step S214). The controller 29 repeatedly decides whether the second discharge tray 49 is full (step S215). In this case, the document M, placed on the document tray 33 with the front face oriented upward, is transported from the document tray 33, through the common transport route 45 and the second transport route 47, and to the second discharge tray 49. Each time the document M is transported as above, the CIS 42 reads the image on the downwardly oriented back face of the document M, being transported through the common transport route 45, and the CIS 43 reads the image on the upwardly oriented front face of the document M, being transported through the second transport route 47. The image data representing the images on the front face and the back face of the document M is stored in the image memory 26. Then the image forming device 21 forms the images on the front face and the back face of the document M, represented by the image data, on the front and back faces of the recording sheet P, respectively.

Upon deciding, in contrast, that the second discharge tray 49 is full (Yes at step S215), the controller 29 restricts the document M from being discharged to the second discharge tray 49, and inhibits and suspends the document reading operation in the second moving document duplex reading mode (step S216). The controller 29 then executes the document reading operation in the first moving document duplex reading mode, including transporting the document M placed on the document tray 33 with the front face oriented upward, causing the CIS 42 to read the image on the downwardly oriented back face of the document M, causing the CCD sensor 11 of the reading device 32 to read the image on the front face of the document M, and discharging the document M to the first discharge tray 40 (step S217). In this case, the document M is transported from the document tray 33, through the common transport route 45 and the first transport route 46, and to the first discharge tray 40. Each time the document M is transported as above, the CIS 42 reads the image on the downwardly oriented back face of the document M, being transported through the common transport route 45, and the CCD sensor 11 of the reading device 32 reads the image on the front face of the document M, through the first platen glass 51. The image data representing the images on the front face and the back face of the document M is stored in the image memory 26. Then the image forming device 21 forms the images on the front face and the back face of the document M, represented by the image data, on the front and back faces of the recording sheet P, respectively.

Consequently, the images on the front face and the back face of the documents M on the document tray 33 are successively read, and the documents M are discharged to the first discharge tray 40, through the execution of the first moving document duplex reading mode, even though the document M is restricted from being discharged to the second discharge tray 49, and the second moving document duplex reading mode is inhibited.

According to the second embodiment, as described above, the documents M are successively read, even though the document M is restricted from being discharged to the first discharge tray 40 or the second discharge tray 49, and therefore the reading efficiency of the image of the document M can be prevented from being degraded.

Figure 7:
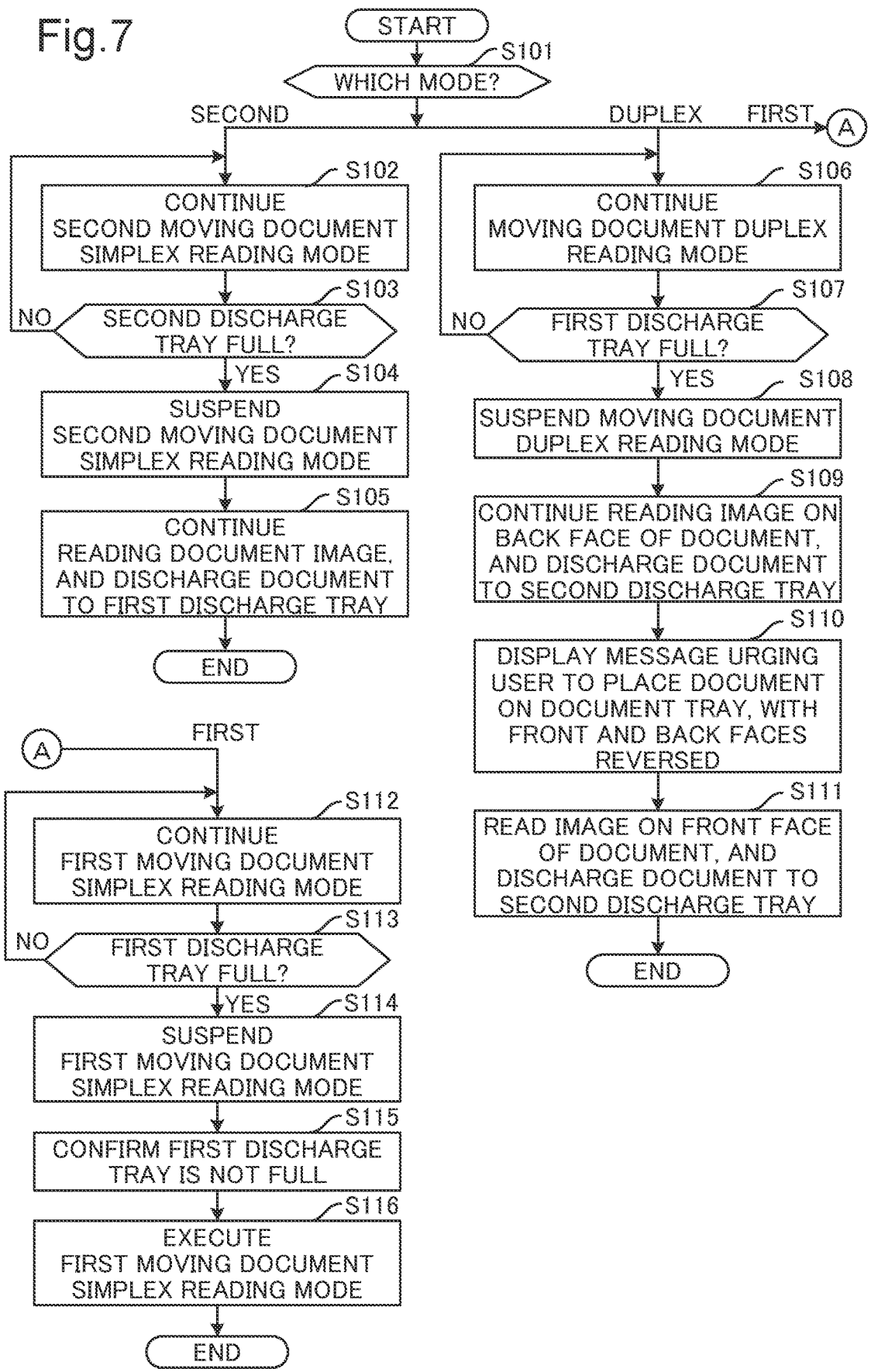
FIG. 7 is a flowchart showing a control process of a discharge destination switching operation, according to the first embodiment.

In the case of switching the mode for discharging the document to one of the trays, to the mode for discharging the document to the other tray, when the first mentioned tray is full, in the discharge destination switching operation shown in FIG. 7 and FIG. 11, the controller 29 confirms that the other tray is not full, on the basis of the detection result from the first full-load detector 61 or the second full-load detector 62, before switching the mode.

Although the first full-load detector 61 detects that the first discharge tray 40 is full, and the second full-load detector 62 detects that the second discharge tray 49 is full, according to the first and second embodiments, the disclosure is not limited to such embodiments. For example, the controller 29 may count the first number of sheets of the documents M discharged to the first discharge tray 40, and the second number of sheets of the documents M discharged to the second discharge tray 49, and decide whether the first discharge tray 40 is full and whether the second discharge tray 49 is full, depending on whether the first number of sheets and the second number of sheets have reached predetermined respective thresholds.

The controller 29 decides whether the document M may be discharged to the first discharge tray 40, depending on whether the first discharge tray 40 is full, and decides whether the document M may be discharged to the second 1 discharge tray 49, depending on whether the second 1 discharge tray 49 is full. To be more specific, the controller 29 decides that the document M should not be discharged to the first discharge tray 40, when the first number of sheets is equal to or larger than a first threshold, and decides that the document M should not be discharged to the second discharge tray 49, when the second number of sheets is equal to or larger than a second threshold.

Further, the reading device 32 may be substituted with the contact image sensor, in the first and second embodiments.

The configurations and processings of the first and second embodiments, described with reference to FIG. 1 to FIG. 11, are merely exemplary, and in no way intended to limit the disclosure to those configurations and processings. For example, the image reading apparatus 20 further including the controller 29 constitutes an example of the image reading apparatus according to the disclosure.

While the present disclosure has been described in detail with reference to the embodiments thereof, it would be apparent to those skilled in the art the various changes and modifications may be made therein within the scope defined by the appended claims.

What is claimed is:

1. An image reading apparatus comprising:
a document tray;
a common transport route;
a first transport route and a second transport route branched from the common transport route;
a switching device provided at a branch point between the first transport route and the second transport route, and configured to guide the document from the common transport route, to one of the first transport route and the second transport route;
a document transport device that draws out the document placed on the document tray therefrom, transports the document through the common transport route, and delivers the document transported from the common transport route, to one of the first transport route and the second transport route, via the switching device;
a first image sensor that reads an image on a first face of the document being transported through the first transport route;
a second image sensor that reads an image on a second face of the document being transported through the common transport route;
a first discharge tray that receives the document delivered from the first transport route;
a second discharge tray that receives the document delivered from the second transport route; and
a control device including a processor, and configured to act, when the processor executes a control program, as:
a controller that executes one of a first simplex reading mode including causing the switching device to guide the document from the common transport route to the first transport route, causing the first image sensor to read the image on the first face of the document, and discharging the document to the first discharge tray, and a second simplex reading mode including causing the second image sensor to read the image on the second face of the document, causing the switching device to guide the document from the common transport route to the second transport route, and discharging the document to the second discharge tray;
decides whether the document may be discharged to the first discharge tray, and whether the document may be discharged to the second discharge tray; and
inhibits the first simplex reading mode, upon deciding that the document should not be discharged to the first discharge tray, and inhibits the second simplex reading mode, upon deciding that the document should not be discharged to the second discharge tray, wherein the controller is configured to:
execute a duplex reading mode including causing the second image sensor to read the image on the second face of the document, causing the switching device to guide the document from the common transport route to the first transport route, causing the first image sensor to read the image on the first face of the document, and discharging the document to the first discharge tray;
inhibit the duplex reading mode, upon deciding, during execution of the duplex reading mode, that the document should not be discharge to the first discharge tray, and execute the second simplex reading mode including causing the second image sensor to read the image on the second face of the document, and discharging the document to the second discharge tray by causing the switching device to guide the document from the common transport route to the second transport route; and
again execute, when a user places the document discharged to the second discharge tray on the document tray, with front and back faces reversed, the second simplex reading mode including causing the second image sensor to read the image on the first face of the document, the front and back faces of which have been reversed, and discharging the document again to the second discharge tray, by causing the switching device to guide the document from the common transport route to the second transport route.

2. The image reading apparatus according to claim 1, further comprising an image forming device that forms the image on the first face of the document and the image on the second face of the document, on front and back faces of a recording sheet, respectively,
wherein the controller causes the image forming device, upon executing the second simplex reading mode again, to form the images on the first face and the second face of the document that have been read, on the front and back faces of the recording sheet, respectively, such that an order of the images on the first face and the second face of the document accords with an order of the images on the front and back faces of the recording sheet.

3. The image reading apparatus according to claim 1, further comprising:
a display device; and
an operation device to which an instruction of the user is inputted,
wherein, upon deciding, during the execution of the duplex reading mode, that the document should not be discharged to the first discharge tray, the controller causes the display device to display a message urging the user to reverse the front and back faces of the document discharged to the second discharge tray, and executes the second simplex reading mode again, upon receipt of an instruction to read the document in the second simplex reading mode, through the operation device.

4. An image reading apparatus comprising:
a document tray;
a common transport route;
a first transport route and a second transport route branched from the common transport route;
a switching device provided at a branch point between the first transport route and the second transport route, and configured to guide the document from the common transport route, to one of the first transport route and the second transport route;

a document transport device that draws out the document placed on the document tray therefrom, transports the document through the common transport route, and delivers the document transported from the common transport route, to one of the first transport route and the second transport route, via the switching device;

a first image sensor that reads an image on a first face of the document being transported through the first transport route;

a third image sensor that reads an image on the first face of the document being transported through the second transport route;

a first discharge tray that receives the document delivered from the first transport route;

a second discharge tray that receives the document delivered from the second transport route; and a control device including a processor, and configured to act, when the processor executes a control program, as:

a controller that executes one of a first simplex reading mode including causing the switching device to guide the document from the common transport route to the first transport route, causing the first image sensor to read the image on the first face of the document, and discharging the document to the first discharge tray, and a third simplex reading mode including causing the switching device to guide the document from the common transport route to the second transport route, causing the third image sensor to read the image on the first face of the document, and discharging the document to the second discharge tray;

decides whether the document may be discharged to the first discharge tray, and whether the document may be discharged to the second discharge tray; and inhibits the first simplex reading mode and executes the third simplex reading mode, upon deciding, during execution of the first simplex reading mode, that the document should not be discharged to the first discharge tray, and inhibits the third simplex reading mode and executes the first simplex reading mode, upon deciding, during execution of the third simplex reading mode, that the document should not be discharged to the second discharge tray, wherein the image reading apparatus further comprising a second image sensor that reads the image on a second face of the document being transported through the common transport route, wherein the controller is configured to:

execute one of a first duplex reading mode including causing the second image sensor to read the image on the second face of the document, causing the switching device to guide the document from the common transport route to the first transport route, causing the first image sensor to read the image on the first face of the document, and discharging the document to the first discharge tray, and a second duplex reading mode including causing the second image sensor to read the image on the second face of the document, causing the switching device to guide the document from the common transport route to the second transport route, causing the third image sensor to read the image on the first face of the document, and discharging the document to the second discharge tray; and inhibit the first duplex reading mode and execute the second duplex reading mode, upon detecting, during the execution of the first duplex reading mode, that the document should not be discharged to the first discharge tray, and inhibit the second duplex reading mode and execute the first duplex reading mode, upon detecting, during the execution of the second duplex reading mode, that the document should not be discharged to the second discharge tray.

\* \* \* \* \*